C. B. POST.
AUTOMATIC CONTROLLER FOR STEERING GEAR.
APPLICATION FILED NOV. 5, 1915.
1,204,819.
Patented Nov. 14, 1916.
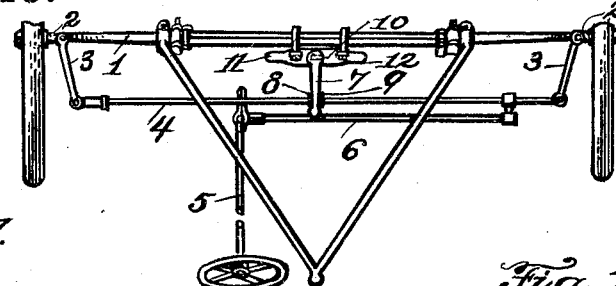
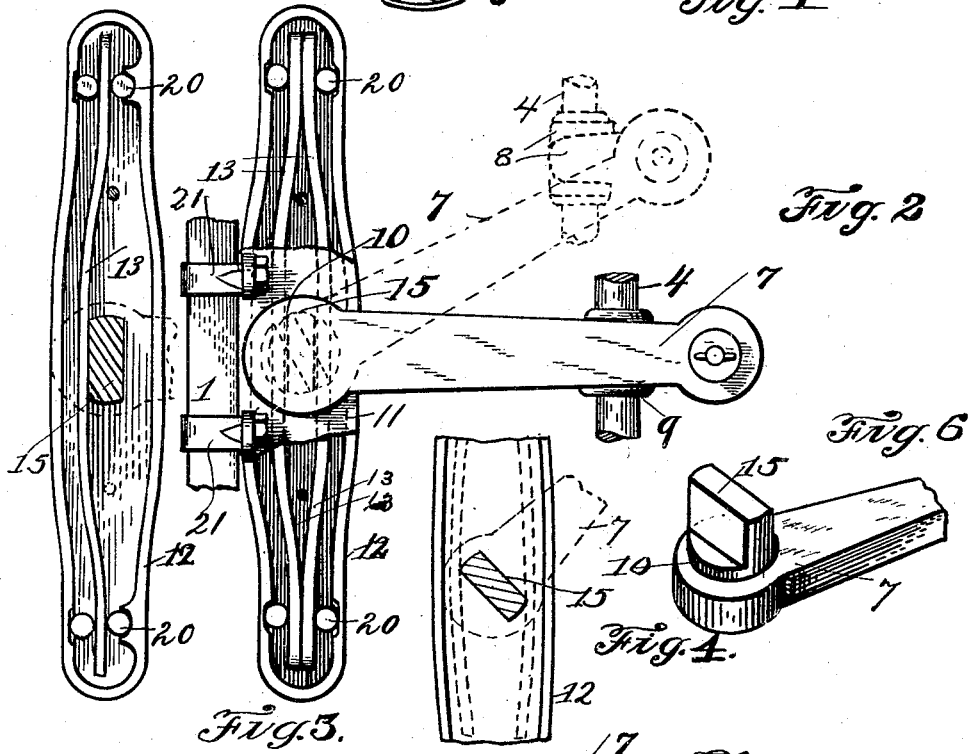
Witnesses.
Inventor.
Charles B. Post
By
Attorney.

UNITED STATES PATENT OFFICE.

CHARLES B. POST, OF NEW LONDON, OHIO.

AUTOMATIC CONTROLLER FOR STEERING-GEAR.

1,204,819.  Specification of Letters Patent.  Patented Nov. 14, 1916.

Application filed November 5, 1915. Serial No. 59,720.

*To all whom it may concern:*

Be it known that I, CHARLES B. POST, a citizen of the United States, and resident of New London, in the county of Huron and State of Ohio, have invented certain new and useful Improvements in Automatic Controllers for Steering-Gear, of which I hereby declare the following to be a full, clear, and exact description, such as will enable others skilled in the art to which it appertains to make and use the same.

The objects of the invention are to provide a simple and efficient device tending always to restore the steering gear of an automobile to the normal position in which the steering wheels are directed straight ahead and in planes substantially parallel with the driving wheels, so that if the steering wheels should become forcibly turned aside by any sudden shock from the rectilinear direction, they will be immediately and automatically restored to the central position and therefore relieve the strain upon the operator, who sometimes loses his presence of mind in an emergency and fails to turn the steering gear quickly enough to avoid an accident. It also permits the driver to give his attention to other matters and especially to give necessary attention to other parts of the mechanism which may need observation and hence adds safety in handling the machine.

The invention operates automatically in two directions and therefore serves as an equalizer and operates easily since the resistance is slightest at the normal position.

The invention comprises the combination and arrangement of a lever operatively connected with the steering rod and means acting automatically to return the lever to a central position when moved to either side and thus prevent it from moving unexpectedly beyond the control of the operator.

The invention further includes the combination and arrangement of parts and construction of details hereinafter described, shown in the accompanying drawings and specifically pointed out in the claims.

In the accompanying drawings Figure 1 is a plan view of the device attached to the front axle of an automobile; Fig. 2 is a plan view of the device showing the cover of the spring inclosing casing broken away; Fig. 3 is a side elevation thereof; Fig. 4 is a transverse section of the flat engaging lug or bar on the operating lever and showing expanded springs in dotted lines; Fig. 5 is a vertical transverse section through the spring casing and springs, showing the operating lever and means for connecting the same with the rod which connects the wheel hub levers. Fig. 6 is a perspective view of one end of the operating lever; Fig. 7 is a plan view showing a modified form with only one spring.

In these views 1 represents the wheel axle, 2, 2, the wheel hubs pivoted thereon, 3, 3, the levers which operate the wheel hubs; 4 is a rod connecting these levers; 5 is the steering column and 6 is a rod operated thereby and attached to the rod 4; 7 is a lever operatively connected with the rod 4 by means of the link 8 which is pivoted to one end of the lever 7 and clamped at 9 upon the rod 4. The other end of the lever 7 is pivoted at 10 in the cover 11 of an elongated casing 12 in which are longitudinally mounted two metal spring bars or bands 13, 13, which are restrained from lateral movement at their outer ends by means of balls or rollers 20, 20 in the casing, but inclose between them the flattened lug or offset 15 upon the pivotal center of the lever 7. The flattened lug extends longitudinally between the spring bands and when the lever is turned in either direction by movement of the wheels the spring bands will be pressed apart and place the edges of the lug under torsional pressure tending always to restore the lever to the central position. In Fig. 7 only one spring 13' is shown, the action being similar, although not as forcible as when two springs are used. The springs are preferably movable at their ends upon the rollers 20, 20, mounted in the case, since when separated at their center the ends would have a certain amount of longitudinal movement, and in this manner friction is avoided. The casing is directly attached to the center of the axle by means of clamps 21, 21, respectively. The amount of pressure exerted by the springs becomes greater the farther they are separated and the wheels when turned aside will be quickly restored to the direct path, thus relieving the operator from the constant strain and aiding him in restoring the machine to the right path when accidentally thrown out of direction and making the steering much easier.

Having described the invention what I claim as new and desire to secure by Letters Patent is:

1. In combination with an automobile axle, the pivoted hubs and levers and connecting rod therefor, a narrow casing secured to said axle, a lever pivoted transversely therein, a link connecting the outer end of said lever with said connecting rod, a flattened member in said casing upon the pivotal point of said lever, and curved springs engaged by said flattened member on both sides, the extremities of said springs lying back to back, and rollers mounted in the walls of said casing engaging the outer sides of said springs.

2. In a device for controlling the steering gear of an automobile, the combination with the axle, hub levers and connecting rod, of an elongated narrow casing upon said axle, said casing having a cover, a lever pivoted on said cover and having an extension entering the casing and flat on both sides, springs placed back to back longitudinally of said casing between which said flat extension is positioned, the extremities of said springs slidingly movable on each other, and a link connecting the outer end of said lever with said connecting rod.

3. In a device for controlling the steering gear of an automobile, the combination with the axle, the hub levers and connecting rod, of a narrow casing secured to said axle, a pair of springs loosely positioned therein back to back and slidable on each other, a lever pivoted in the casing and having a flat member extended from the pivotal point and entering between said springs, and means for connecting said lever and connecting rod permitting free action of the parts relatively to each other.

In testimony whereof, I hereunto set my hand this 11 day of Oct. 1915.

CHARLES B. POST.

In presence of—.
WM. M. MONROE,
RALPH W. JEREMIAH.

Copies of this patent may be obtained for five cents each, by addressing the "Commissioner of Patents, Washington, D. C."